US009096163B2

(12) United States Patent
Ito (10) Patent No.: US 9,096,163 B2
(45) Date of Patent: Aug. 4, 2015

(54) LIGHT SOURCE UNIT HAVING A METALLIC SUBSTRATE WITH A HEAT DISSIPATION PART, AND VEHICULAR LAMP HAVING THE LIGHT SOURCE UNIT (71) Applicant: Noriaki Ito, Shizuoka (JP)

(72) Inventor: Noriaki Ito, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 220 days.

(21) Appl. No.: 13/780,388

(22) Filed: Feb. 28, 2013

(65) Prior Publication Data
US 2013/0250601 A1 Sep. 26, 2013

(30) Foreign Application Priority Data

Mar. 23, 2012 (JP) ................................. 2012-067748

(51) Int. Cl.
*B60Q 1/00* (2006.01)
*F21V 29/00* (2015.01)
*F21V 19/00* (2006.01)
*F21S 8/10* (2006.01)
*F21V 29/507* (2015.01)
*F21Y 101/02* (2006.01)

(52) U.S. Cl.
CPC .............. *B60Q 1/0064* (2013.01); *F21S 48/211* (2013.01); *F21S 48/215* (2013.01); *F21S 48/2206* (2013.01); *F21S 48/2212* (2013.01); *F21S 48/2218* (2013.01); *F21V 19/003* (2013.01); *F21V 29/00* (2013.01); *F21V 29/004* (2013.01); *F21V 29/20* (2013.01); *F21V 29/507* (2015.01); *F21S 48/328* (2013.01); *F21S 48/33* (2013.01); *F21Y 2101/02* (2013.01)

(58) Field of Classification Search
CPC .... F21V 29/002; F21V 29/004; F21S 48/335; F21S 48/332; F21S 48/328; F21S 48/32
USPC .......................................... 362/294, 373, 547
See application file for complete search history.

(56) References Cited

U.S. PATENT DOCUMENTS

| 5,479,066 A | * | 12/1995 | Willems et al. .......... 313/318.05 |
| 7,914,162 B1 | * | 3/2011 | Huang .............................. 362/92 |
| 2008/0212333 A1 | * | 9/2008 | Chen .............................. 362/373 |

(Continued)

FOREIGN PATENT DOCUMENTS

| CN | 101832534 A | 9/2010 |
| CN | 201787506 U | 4/2011 |

(Continued)

OTHER PUBLICATIONS

English Patent Abstract of JP 2010135198 from esp@cenet, Publication Date: Jun. 17, 2010 (1 Page).
Notification of the First Office Action issued in corresponding Chinese Application No. 201310091787.2, mailed on Dec. 3, 2014 (13 pages).

*Primary Examiner* — Robert May
(74) *Attorney, Agent, or Firm* — Osha Liang LLP (57) ABSTRACT

A light source unit is provided with a housing, a substrate, and light-emitting devices. The light-emitting devices are mounted on a mounting part of the substrate. A heat dissipation part extends from an outer edge of the mounting part in a direction opposite to a light emitting direction of the light-emitting devices. The mounting part is held on a bottom part of the housing. A peripheral groove part extends in the direction opposite to the light emitting direction along an outer edge of the bottom part. The heat dissipation part is accommodated in the peripheral groove part.

8 Claims, 10 Drawing Sheets

(56) References Cited

U.S. PATENT DOCUMENTS

| | | |
|---|---|---|
| 2008/0253127 A1* | 10/2008 | Willwohl et al. ............. 362/294 |
| 2009/0185381 A1* | 7/2009 | Willwohl et al. ............. 362/294 |
| 2011/0058387 A1 | 3/2011 | Matsunaga et al. |
| 2011/0175529 A1 | 7/2011 | Hayashi et al. |

FOREIGN PATENT DOCUMENTS

| | | |
|---|---|---|
| CN | 102182971 A | 9/2011 |
| EP | 2194311 A2 | 6/2010 |
| JP | 2010135198 A | 6/2010 |
| JP | 2011-210472 A | 10/2011 |

* cited by examiner

LIGHT SOURCE UNIT HAVING A METALLIC SUBSTRATE WITH A HEAT DISSIPATION PART, AND VEHICULAR LAMP HAVING THE LIGHT SOURCE UNIT

FIELD OF THE INVENTION

The present invention relates to a light source unit and a vehicular lamp.

RELATED ART

JP-A-2010-135198 discloses a light source unit in which a semiconductor light-emitting device and a control electronic component are mounted on a bus bar assembly structured by a plurality of bus bar arranged in a plane and a circuit is defined.

When the light source unit as described above is used in a vehicular lamp, it is necessary to replace or repair the light source unit depending on a lifetime or a failure of the semiconductor light-emitting device or the electronic component. Further, since a performance of the semiconductor light-emitting device may be often degraded by heat, there is a need for further improvement in a heat dissipation performance in accordance with an increase in the number of semiconductor light-emitting devices to be used.

SUMMARY OF THE INVENTION

One or more embodiments of the invention provide a new light source unit taking into account a heat dissipation performance.

DETAILED DESCRIPTION OF THE EMBODIMENTS

An exemplary embodiment will be described in detail with reference to the accompanying drawings. The same or similar reference numerals are applied to the same or similar parts, elements and process throughout the drawings and a duplicated description thereof will be omitted. Further, the embodiment is only an example and not intended to limit the invention. It should be noted that all the features and their combinations described in the embodiment are not necessarily considered as essential to the invention.

In the following description, a rear combination lamp including a back lamp or stop lamp or the like is described as an example of a vehicular lamp. The vehicular lamp is not limited to theses lamps.
(Vehicular Lamp)

Figure 1:
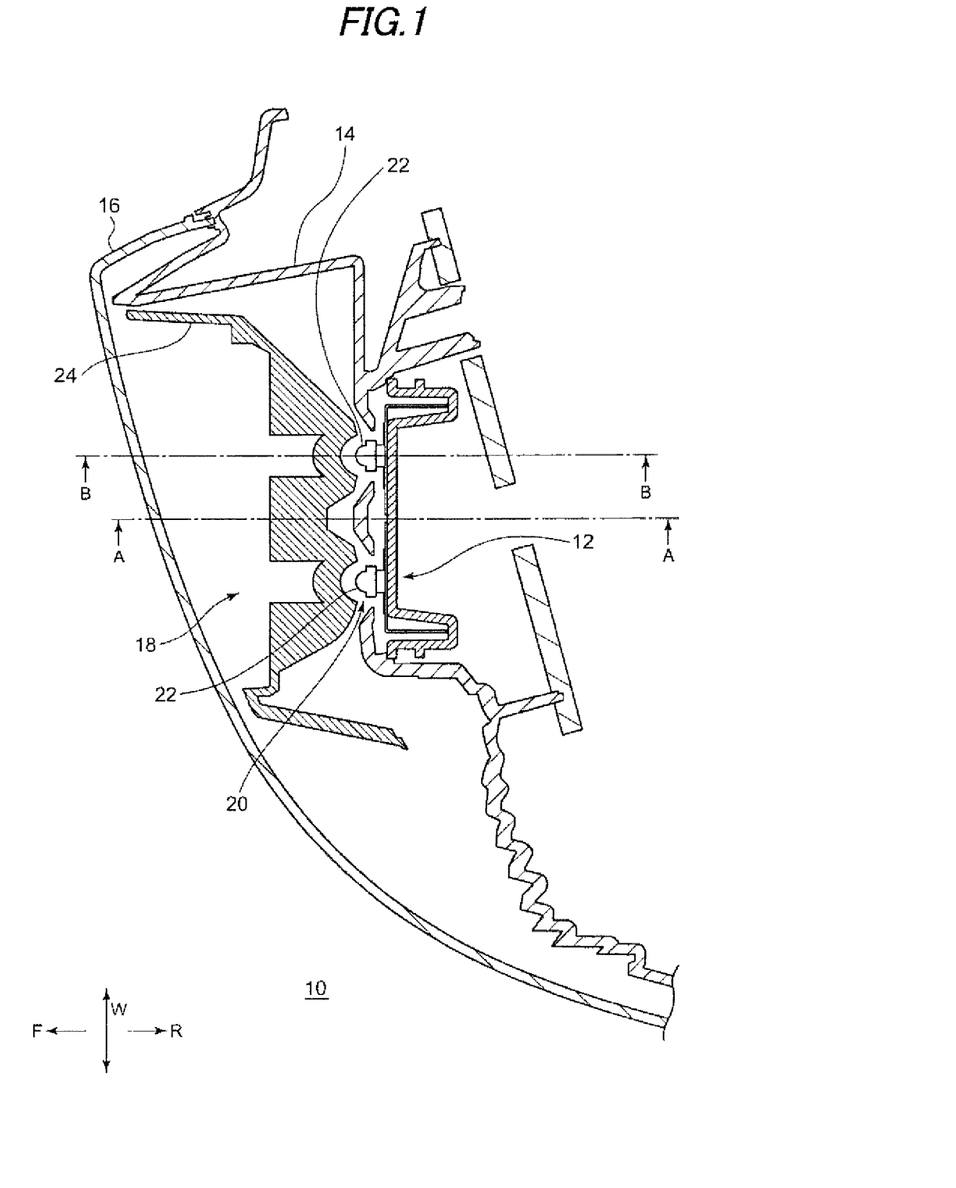
FIG. 1 is a horizontal sectional view showing a vehicular lamp according to an exemplary embodiment.
Figure 2:
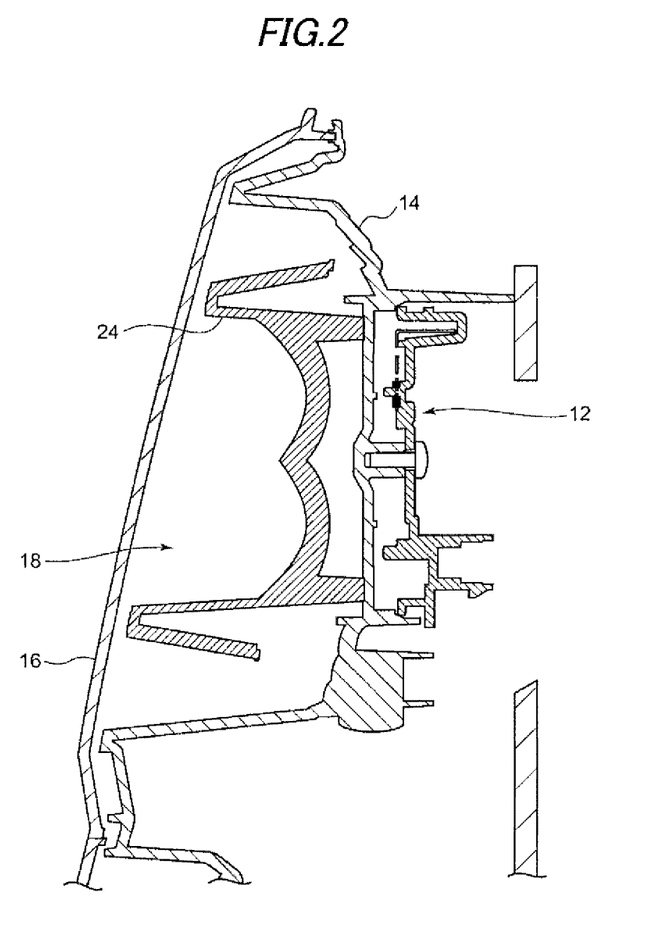
FIG. 2 is a sectional view taken along a line A-A of FIG. 1.
Figure 3:
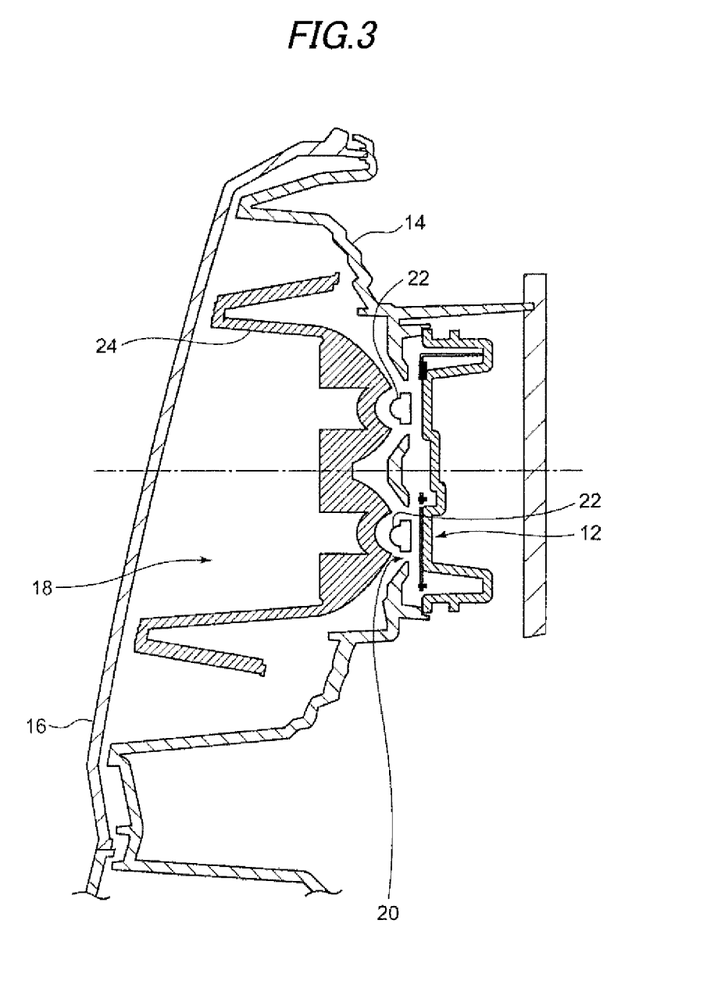
FIG. 3 is a sectional view taken along a line B-B of FIG. 1.

FIG. 1 is a horizontal sectional view showing a vehicular lamp 10 according to the embodiment. FIG. 2 is a sectional view taken along a line A-A of FIG. 1. FIG. 3 is a sectional view taken along a line B-B of FIG. 1. In the following description, for the convenience of explanation, an arrow F shown FIG. 1 refers to a front side, an arrow R refers to a rear side and an arrow W refers to a vehicle width direction. However, it is noted that the directions referred to herein are relative directions and an arrangement in an actual vehicular lamp is not necessarily limited to these directions, (Throughout this detailed description of the exemplary embodiment, an irradiation direction of the vehicular lamp is expressed as a "front direction". Note that, when the vehicular lamp is the rear combination lamp, the "front direction (of the vehicular lamp)" corresponds to a rear direction of a vehicle body.)

The vehicular lamp 10 according to the embodiment includes a light source unit 12 and a lamp body 14 to which the light source unit 12 is removably mounted. The lamp body 14 has a concave part which is opened to the front. A cover 16 is mounted to the lamp body 14 to close the front side of the concave part. A space surrounded by the lamp body 14 and the cover 16 constitutes a lamp chamber 18.

The light source unit 12 is mounted from the rear side of an opening 20 formed at the lamp body 14. Further, the light source unit 12 is mounted to the lamp body 14 so that a plurality of semiconductor light-emitting devices 22 such as LED chips is located at the opening 20.

An inner lens 24 is provided in the lamp chamber 18. The inner lens 24 is a transparent member which transmits the light emitted by the semiconductor light-emitting devices 22 to the front and is configured by a resin material with colorless, red color or orange color, or the like. Further, the inner lens 24 is disposed to cover the opening 20. Thereby, the semiconductor light-emitting devices 22 disposed at a position corresponding to the opening 20 are not directly visible from the front side of the vehicular lamp 10 and therefore visual quality and design property of the lamp are improved.
(Light Source Unit)

Figure 4:
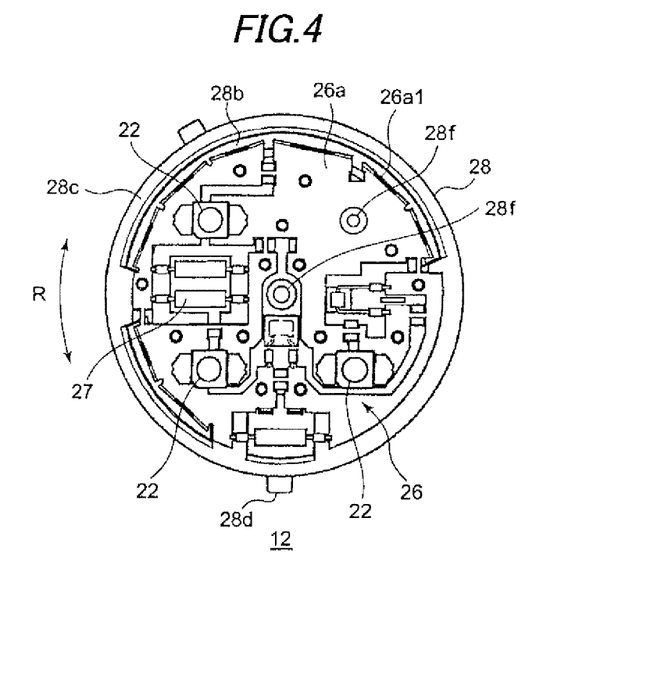
FIG. 4 is a front view showing a light source unit according to the exemplary embodiment.
Figure 5:
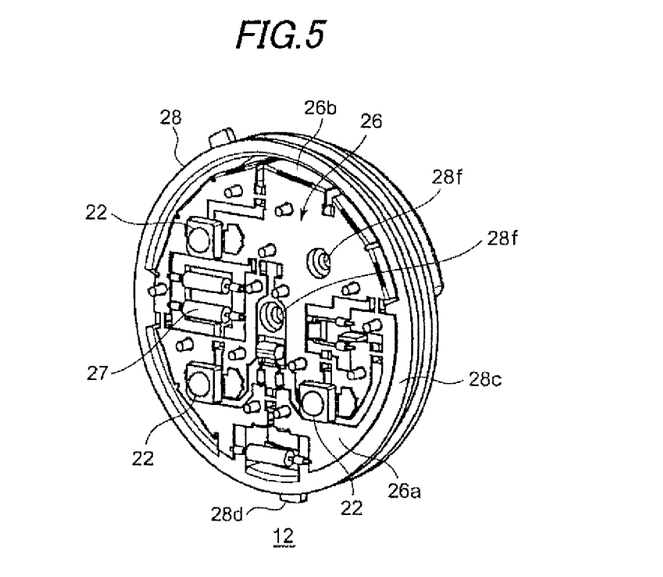
FIG. 5 is a perspective view showing the light source unit according to the exemplary embodiment.
Figure 6:
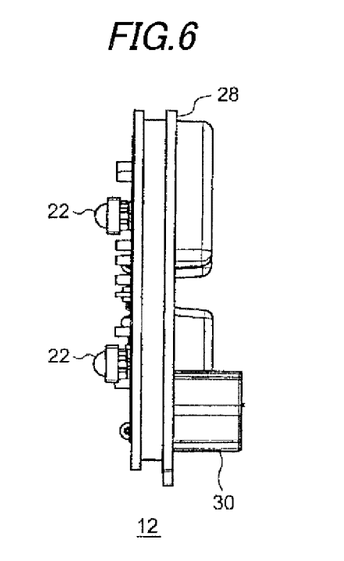
FIG. 6 is a side view showing the light source unit according to the exemplary embodiment.
Figure 7:
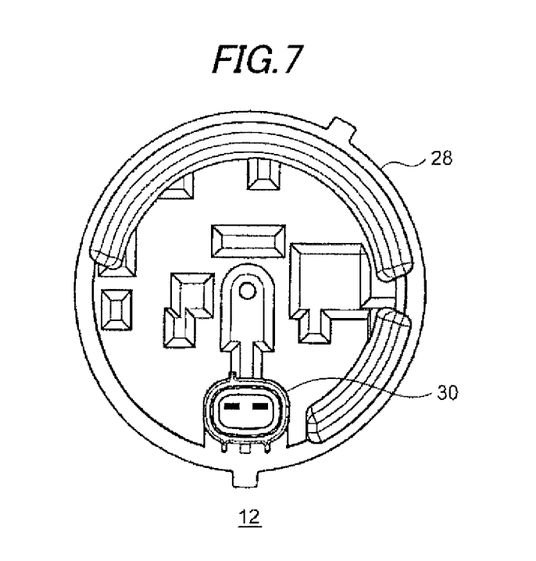
FIG. 7 is a rear view showing the light source unit according to the exemplary embodiment.
Figure 8:
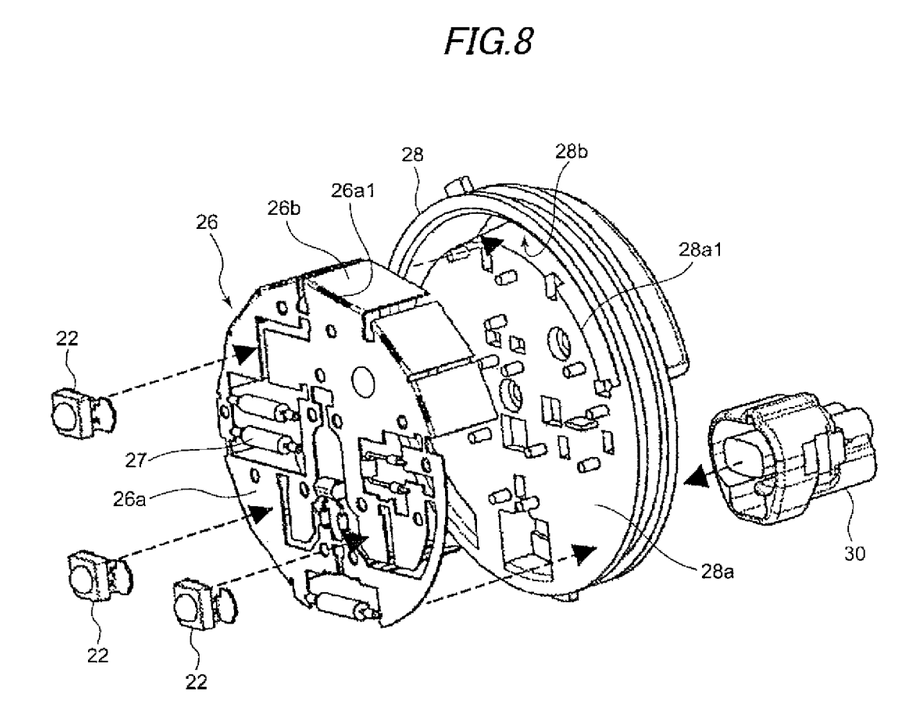
FIG. 8 is an exploded perspective view showing the light source unit according to the exemplary embodiment.

The light source unit 12 is described in detail. FIG. 4 is a front view showing a light source unit 12 according to the embodiment. FIG. 5 is a perspective view showing the light source unit according to the embodiment. FIG. 6 is a side view showing the light source unit according to the embodiment. FIG. 7 is a rear view showing the light source unit according to the embodiment. FIG. 8 is an exploded perspective view showing the light source unit according to the embodiment.

The light source unit 12 according to the embodiment includes the plurality of semiconductor light-emitting devices 22, a bus bar 26 as a metallic substrate for mounting the plurality of semiconductor light-emitting devices 22 thereon and a bottomed cylindrical housing 28 for containing and holding the bus bar 26 therein. The plate-shaped bus bar 26 is produced by punching or bending a metallic plate such as a cooper plate or an aluminum plate. Further, as the substrate for mounting the semiconductor light-emitting devices 22 thereon, a printed substrate or a flexible printed substrate may be used. The housing 28 is made of a resin material, for example.

The bus bar 26 according to the embodiment includes a mounting part 26a for mounting the plurality of semiconductor light-emitting devices 22 thereon and a heat dissipation part 26b which is formed to extend from an outer edge 26a1 of the mounting part 26a toward a side opposite to a light emitting direction of the semiconductor light-emitting devices 22 and configured to dissipate heat emitted by the semiconductor light-emitting devices 22. In addition to the semiconductor light-emitting devices 22, a passive device 27 such as a resistor is mounted on the mounting part 26a.

The housing 28 includes a bottom part 28a for holding the mounting part 26a and a peripheral groove part 28b which is formed to protrude toward a side opposite to the light emitting direction along an outer edge 28a1 of the bottom part 28a and configured to accommodate the heat dissipation part 26b of the bus bar 26. Further, a connector 30 connected to a wiring is provided in a rear side of the housing 28 in order to enable the power supply to the semiconductor light-emitting devices 22. Thereby, the heat emitted by the semiconductor light-emitting devices 22 can be dissipated from the heat dissipation part 26b. Further, since the heat dissipation part 26b is accommodated in the peripheral groove part 28b of the housing 28, it is possible to improve a drip-proof property of the heat dissipation part 26b.

Figure 9:
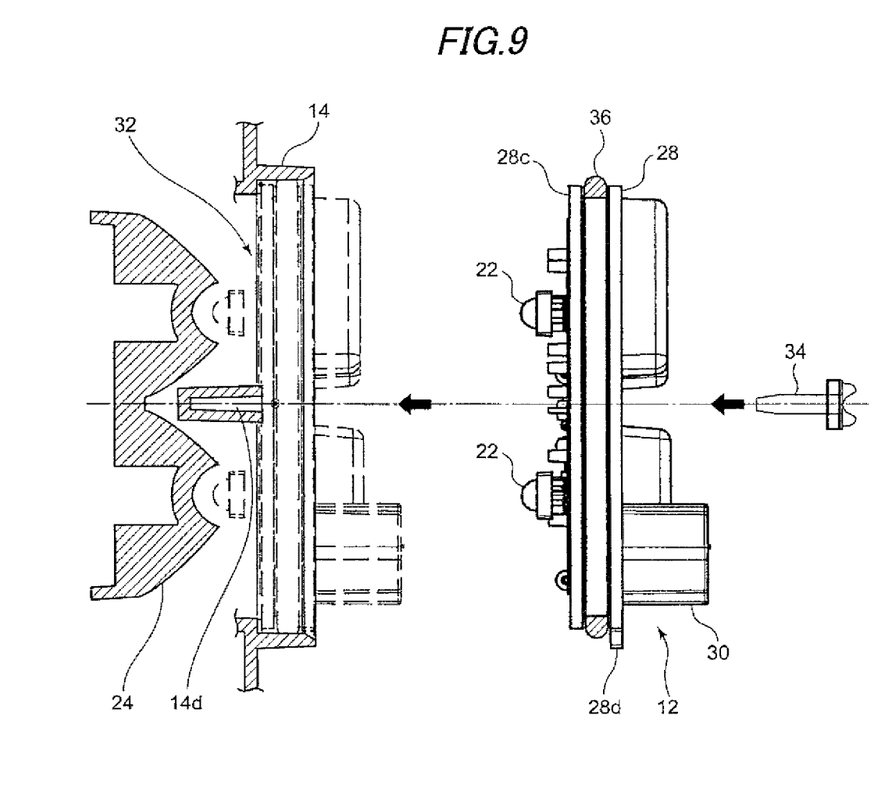
FIG. 9 is a schematic view showing a state where the light source unit is mounted to a lamp body.
Figure 10:
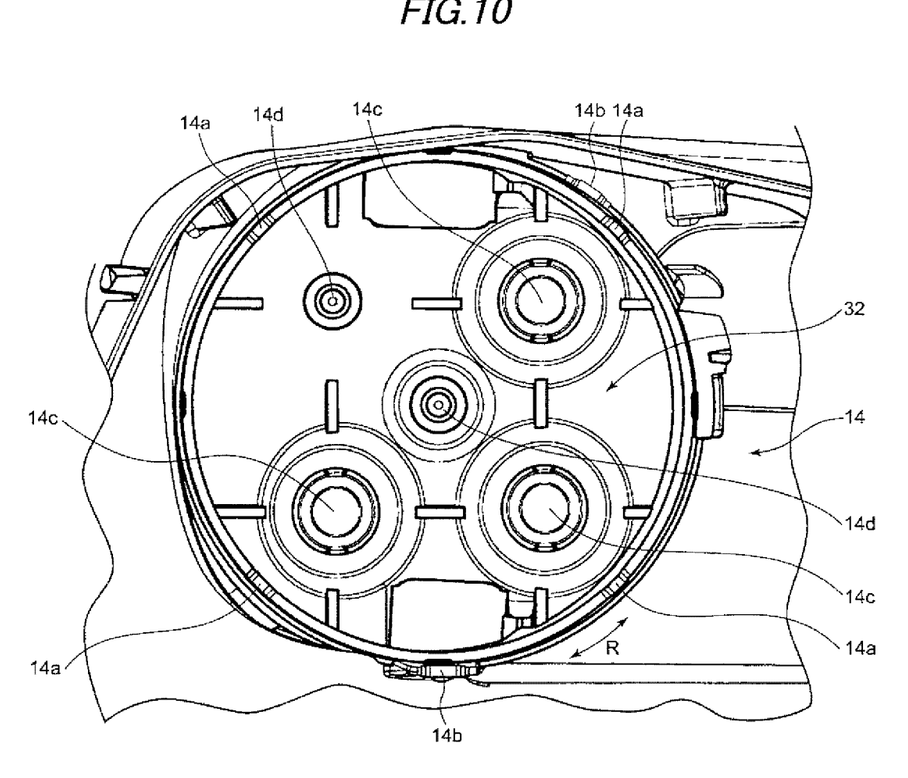
FIG. 10 is a view showing an area in the vicinity of a mounting part of the light source unit in a rear side of the lamp body.
Figure 11:
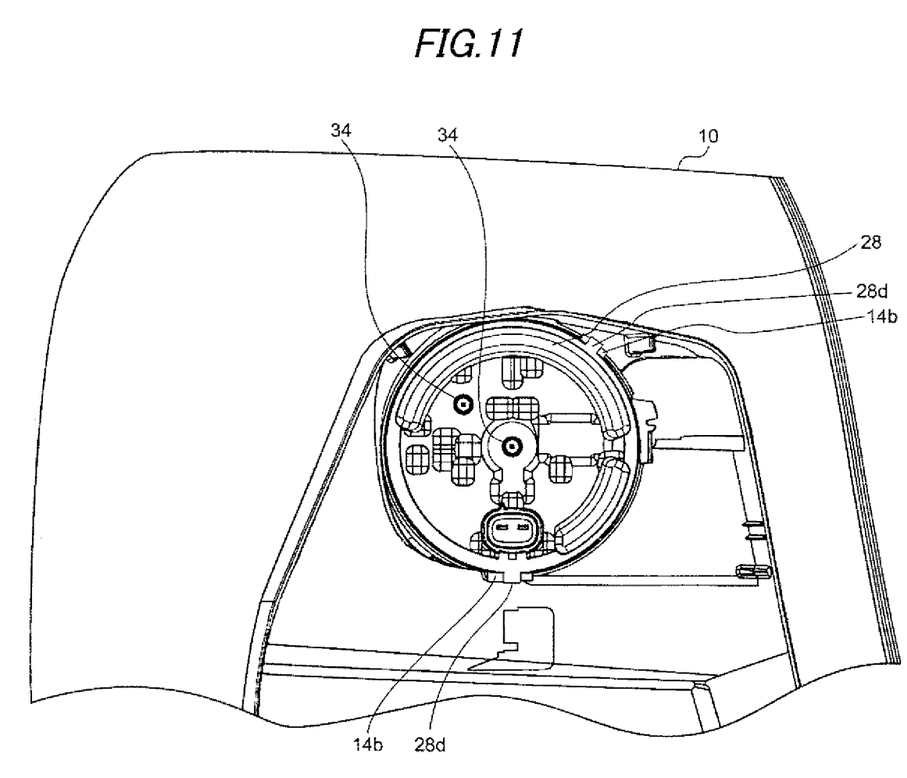
FIG. 11 is a view showing a vehicular lamp in a state where the light source unit is mounted to the lamp body, as seen from the rear.

FIG. 9 is a schematic view showing a state where the light source unit is mounted to a lamp body. FIG. 10 is a view showing an area in the vicinity of a mounting part of the light source unit in a rear side of the lamp body. FIG. 11 is a view showing a vehicular lamp in a state where the light source unit is mounted to the lamp body, as seen from the rear.

As shown in FIG. 4 or FIG. 9, the housing 28 includes an annular abutment part 28c at a front end in the light emitting direction. The abutment part 28c is configured to come into contact with four positioning parts 14a (see FIG. 10) formed in the lamp body 14 when the light source unit 12 is inserted into a mounting part 32 of the lamp body 14 from a side of the lamb body 14 opposite to the lamp chamber 18. Although the abutment part 28c according to the embodiment is configured by a continuous annular plane, the abutment part may be a plurality of protrusions arranged in an annular form, for example. Further, although the positioning part 14a according to the embodiment is a plurality of protrusions protruding from a rear side of the lamp body 14, the positioning part may be configured by a continuous annular plane, for example. Thereby, the light source unit 12 can be accurately mounted to a desired position of the lamp body 14 when replacing the light source unit 12.

Further, the housing 28 is provided with convex parts 28d for performing the positioning of the housing in a circumferential direction (a direction of an arrow R shown in FIG. 4 or FIG. 10) when the housing is mounted to the lamp body 14. The convex parts 28d are formed to protrude in a radial direction from an outer periphery of the housing 28. The lamp body 14 includes engaging parts 14b which are engaged with the convex parts 28d to perform the positioning of the housing 28 in the circumferential direction when the housing 28 is mounted and openings 14c which is formed at positions corresponding to the plurality of semiconductor light-emitting devices 22 of the light source unit 12 which is mounted at a normal position.

The engaging part 14b according to the embodiment is a concave part formed at a part of the outer periphery of the mounting part 32. As the convex part 28d of the housing 28 are fitted to the concave parts, the positioning between the light source unit 12 and the lamp body 17 is achieved. Thereby, the light source unit 12 can be accurately mounted to a desired position (particularly, a circumferential position of the mounting part 32) of the lamp body 14. Particularly, in a case where the light source unit 12 includes the plurality of semiconductor light-emitting devices 22, the plurality of semiconductor light-emitting devices 22 is shifted from the openings 14c of the lamp body 14 when the positioning in the circumferential direction is shifted. Accordingly, in this case, the effect of providing the convex parts 28d to the housing 28 becomes greater.

Figure 12:
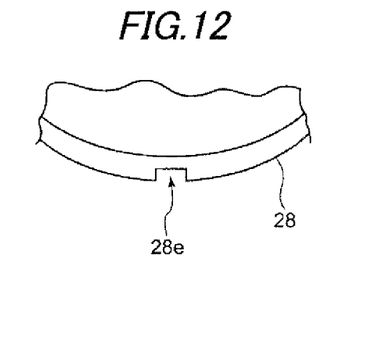
FIG. 12 is a view schematically showing a modification of a positioning part of a housing.

FIG. 12 is a view schematically showing a modification of the positioning part of the housing. As shown in FIG. 12, concave parts 28e may be formed at a part of the outer periphery of the housing 28, as an example of the positioning part. In this case, convex parts may be formed at a part of the outer periphery of the mounting part 32, as an example of the engaging parts of the lamp body 14.

The vehicular lamp 10 according to the embodiment includes a fixing structure which removably fixes the light source unit 12 and the lamp body 14. Specifically, as shown in FIG. 10, two threaded grooves 14d are formed at a rear side of the lamp body 14. Meanwhile, the housing 28 is also formed with two through-holes 28f (see FIGS. 4 and 5) so as to correspond to the threaded grooves 14d.

The light source unit 12 is fixed to the lamp body 14 by passing screws 34 through the through-holes 28f of the housing 28 from the rear side and screwing the screws into the threaded grooves 14d of the lamp body 14. Further, when replacing the light source unit 12, the light source unit 12 can be detached from the lamp body 14 by removing the screws 34. Thereby, the light source unit 12 can be simply fixed to the lamp body 14 while enabling the replacement of the light source unit 12. Here, the number of the screw 34 is not limited two but may be one, or three or more.

Figure 13:
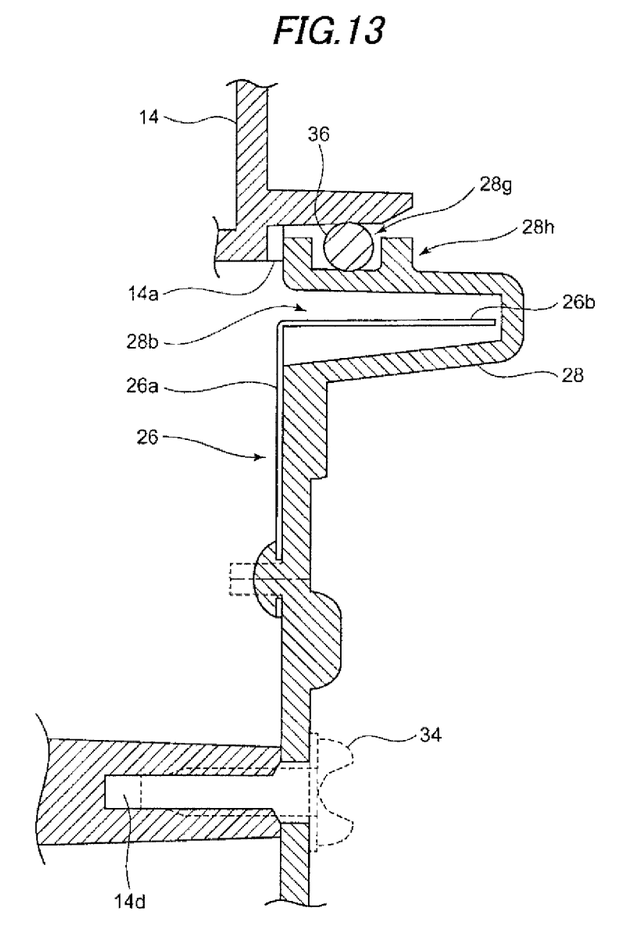
FIG. 13 is a sectional view showing a main part in a state where the light source unit is mounted to the lamp body.

FIG. 13 is a sectional view showing a main part in a state where the light source unit is mounted to the lamp body. As shown in FIG. 13, the housing 28 is formed at its cylindrical side surface 28h with a peripheral groove 28g in which an O-ring 36 as an annular sealing member can be mounted and the O-ring is adapted to seal between the lamp body 14 and the housing 28. Thereby, as the O-ring 36 is mounted in the peripheral groove 28g, water is prevented from entering the interior of the housing 28 or the lamp chamber 18 and therefore it is possible to further reduce failure or deterioration of the semiconductor light-emitting devices 22 or the bus bar 26.

Hereinabove, although the invention has been described with reference to the exemplary embodiment, the invention is not limited to the exemplary embodiment and suitable combinations or modifications are also included in the present invention. Further, the combinations or orders of processes in the exemplary embodiment could be appropriately changed, or various modifications such as design modification could be made to the embodiments, based on the knowledge of those skilled in the art. Such modifications can be also included in the scope of the invention.

In accordance with embodiments, a light source unit may include: a housing 28; a substrate 26 accommodated in the housing 28; and a plurality of light-emitting devices 22 mounted on the substrate 26. The substrate 26 may include: a mounting part 26a on which the plurality of light-emitting devices 26 are mounted; and a heat dissipation part 26b extending from an outer edge of the mounting part 26a in a direction opposite to a light emitting direction of the light-emitting devices 22, wherein heat from the light-emitting devices are dissipated from the heat dissipation part 26b. The housing 28 may include: a bottom part 28a on which the mounting part 26a is held; and a peripheral groove part 28b extending in the direction opposite to the light emitting direction along an outer edge of the bottom part 28a, wherein the heat dissipation part 26b is accommodated in the peripheral groove part 28b.

According to this structure, the heat generated by the semiconductor light-emitting devices can be dissipated from the heat dissipation part. Further, since the heat dissipation part is accommodated in the peripheral groove part of the housing, it is possible to improve a drip-proof property of the heat dissipation part.

In accordance with embodiments, the housing 28 may include an annular abutment part 28c at a front end in the light emitting direction. The abutment part 28c may contact with a positioning part 14a of a lamp body 14 when the light source unit 12 is inserted into a mounting part 32 of the lamp body 14 from a side of the lamb body opposite to a lamp chamber 18.

According to this structure, the light source unit can be accurately mounted to a desired position of the lamp body when replacing the light source unit.

In accordance with embodiments, the housing 28 may include a peripheral groove 28g on a cylindrical side surface of the housing 28. An annular sealing member 36 mounted in the peripheral groove 28g may define a seal between a lamp body 14 and the housing 28 when the light source unit 12 is attached to the lamp body 14.

According to this structure, as the sealing member is mounted in the peripheral groove, water is prevented from entering the interior of the housing and therefore it is possible to further reduce failure or deterioration of the semiconductor light-emitting devices or the metallic substrate.

In accordance with embodiments, a vehicular lamp 10 may include: a lamp body 14; and a light source unit 12 detachably attached to the lamp body 14. The light source unit 12 may include: a housing 28; a substrate 26 accommodated in the housing 28; and a plurality of light-emitting devices 22 mounted on the substrate 26. The substrate 26 may include: a mounting part 26a on which the plurality of light-emitting devices 26 are mounted; and a heat dissipation part 26b extending from an outer edge of the mounting part 26a in a direction opposite to a light emitting direction of the light-emitting devices 22. Heat from the light-emitting devices may be dissipated from the heat dissipation part 26b. The housing 28 may include: a bottom part 28a on which the mounting part 26a is held; a peripheral groove part 28b extending in the direction opposite to the light emitting direction along an outer edge of the bottom part 28a, wherein the heat dissipation part 26b is accommodated in the peripheral groove part 28b; and a convex part 28d or a concave part 28e. The lamp body 14 may include: an engaging part 14b engaged with the convex part 28d or the concave part 28e to position the housing in a circumferential direction when the light source unit 12 is attached to the lamp body 14; and a plurality of openings 14c formed at positions corresponding to the plurality of light-emitting devices 22 of the light source unit 12 which is attached to the lamp body 14 at a normal position.

According to this structure, the light source unit can be accurately mounted to a desired position of the lamp body.

In accordance with embodiments, the vehicular lamp 10 may further include an optical member 24 provided in a lamp chamber 18 of the lamp body 14 and disposed to cover the openings 14c of the lamp body 14.

According to this structure, the semiconductor light-emitting devices disposed at a position corresponding to the opening are not directly visible from the front side of the lamp and therefore visual quality and design property of the lamp are improved.

In accordance with embodiments, the vehicular lamp 10 may further include a fixing structure 14d, 28f, 34 that detachably fixes the light source unit 12 to the lamp body 14.

According to this structure, it is possible to fix the light source unit to the lamp body while enabling the replacement of the light source unit.

Further, any combinations of the above-described features and optional modifications into methods, apparatuses and systems may be effective as embodiments of the present invention.

According to embodiments, it is possible to provide a new light source unit taking into account the heat dissipation performance.

What is claimed is:

1. A light source unit comprising:
a housing;
a metallic substrate accommodated in the housing; and
a plurality of light-emitting devices mounted on the metallic substrate;
wherein the metallic substrate includes:
   a mounting part on which the plurality of light-emitting devices are mounted; and
   a heat dissipation part extending from an outer edge of the mounting part in a direction opposite to a light emitting direction of the light-emitting devices, wherein heat from the light-emitting devices are dissipated from the heat dissipation part, and
wherein the housing includes:
   a bottom part on which the mounting part is held; and
   a peripheral groove part extending in the direction opposite to the light emitting direction along an outer edge of the bottom part, wherein the heat dissipation part is accommodated in the peripheral groove part.

2. The light source unit according to claim 1,
wherein the housing includes an annular abutment part at a tip end in the light emitting direction, and
wherein the abutment part is configured to come into contact with a positioning part of a lamp body when the light source unit is inserted into a mounting part of the lamp body from a side of the lamb body opposite to a lamp chamber.

3. The light source unit according to claim 1,
wherein the housing includes a peripheral groove on a cylindrical side surface of the housing, and
wherein an annular sealing member mounted in the peripheral groove defines a seal between a lamp body and the housing when the light source unit is attached to the lamp body.

4. A vehicular lamp comprising:
a lamp body; and
a light source unit detachably attached to the lamp body,
wherein the light source unit includes:
   a housing;
   a metallic substrate accommodated in the housing; and
   a plurality of light-emitting devices mounted on the metallic substrate;
wherein the metallic substrate includes:
   a mounting part on which the plurality of light-emitting devices are mounted; and
   a heat dissipation part extending from an outer edge of the mounting part in a direction opposite to a light emitting direction of the light-emitting devices, wherein heat from the light-emitting devices are dissipated from the heat dissipation part, wherein the housing includes:
    a bottom part on which the mounting part is held;
    a peripheral groove part extending in the direction opposite to the light emitting direction along an outer edge of the bottom part, wherein the heat dissipation part is accommodated in the peripheral groove part; and
    a convex part or a concave part, and
wherein the lamp body includes:
    an engaging part engaged with the convex part or the concave part to position the housing in a circumferential direction when the light source unit is attached to the lamp body; and
    a plurality of openings formed at positions corresponding to the plurality of light-emitting devices of the light source unit which is attached to the lamp body.

5. The vehicular lamp according to claim 4, further comprising an optical member provided in a lamp chamber of the lamp body and disposed to cover the openings of the lamp body.

6. The vehicular lamp according to claim 4, further comprising a fixing structure that detachably fixes the light source unit to the lamp body.

7. The vehicular lamp according to claim 4,
wherein the housing includes an annular abutment part at a tip end in the light emitting direction,
wherein the abutment part is configured to come into contact with a positioning part of the lamp body when the light source unit is inserted into a mounting part of the lamp body from a side of the lamb body opposite to a lamp chamber.

8. The vehicular lamp according to claim 4,
wherein the housing includes a peripheral groove on a cylindrical side surface of the housing, and
wherein an annular sealing member mounted in the peripheral groove defines a seal between the lamp body and the housing.

* * * * *